Feb. 24, 1970   R. D. FULMER   3,496,870
SPIRAL BURNING PROPELLANT CHARGE
Filed May 23, 1967

INVENTOR.
RICHARD D. FULMER
BY
ROY MILLER
ATTORNEY.

3,496,870
SPIRAL BURNING PROPELLANT CHARGE
Richard D. Fulmer, China Lake, Calif., assignor to the United States of America as represented by the Secretary of the Navy
Filed May 23, 1967, Ser. No. 643,293
Int. Cl. F42b 1/00
U.S. Cl. 102—103         2 Claims

ABSTRACT OF THE DISCLOSURE

A spiral burning propellant charge formed by rolling a solid propellant composition, such as a mixture of nitrocellulose and nitroglycerin, into a sheet, applying a combustion inhibitor, such as ethyl cellulose, to one or both sides and rolling into a cylindrical shape. This type charge provides a long burn time with a minimum of heat transfer to the rocket motor casing.

---

The invention herein described may be manufactured and used by or for the Government of the United States of America for governmental purposes without the payment of any royalites thereon or therefor.

The present invention relates to a spiral burning solid propellant grain and its method of manufacture; more particularly, to a grain having a long burning time and providing thermal portection to the rocket motor wall.

In the field of rocket propellants either internal-burning propellant grains or end-burning grains are commonly used. The internal-burning grain burns from a central perforation outward toward the casing or wall of the rocket motor. Burn times for this type motor are usually low. The end-burning grain is usually for long duration and with this type grain there is a long thickness of propellant to burn through and in turn a long burning time. However, the rocket chamber walls are quickly exposed to the heat from the combustion gases and substantial quantities of insulation must be used to protect the walls. The present invention will overcome most of the disadvantages referred to herein.

It is the general object of the present invention to provide a method of forming a spiral burning propellant grain which comprises rolling a solid propellant composition into a flat sheet, applying a burn inhibitor material to one or both sides and rolling or winding the sheet into a cylindrical roll so that upon ignition the propellant will burn in a spiral manner.

Another object is to provide a cylindrical propellant grain comprising a plurality of layers of propellant composition and a plurality of burn inhibitor layers in which the composition and inhibitor are alternatively laminated to form a structure which burns with a high release of energy at the desired rate.

Yet another object is to provide a rocket propellant grain which allows long burn time with a minimum of heat transfer to the rocket motor case.

Still anoter object is to provide a propellant grain for use in sustainer motors for long range tactical missiles.

Figure 1:
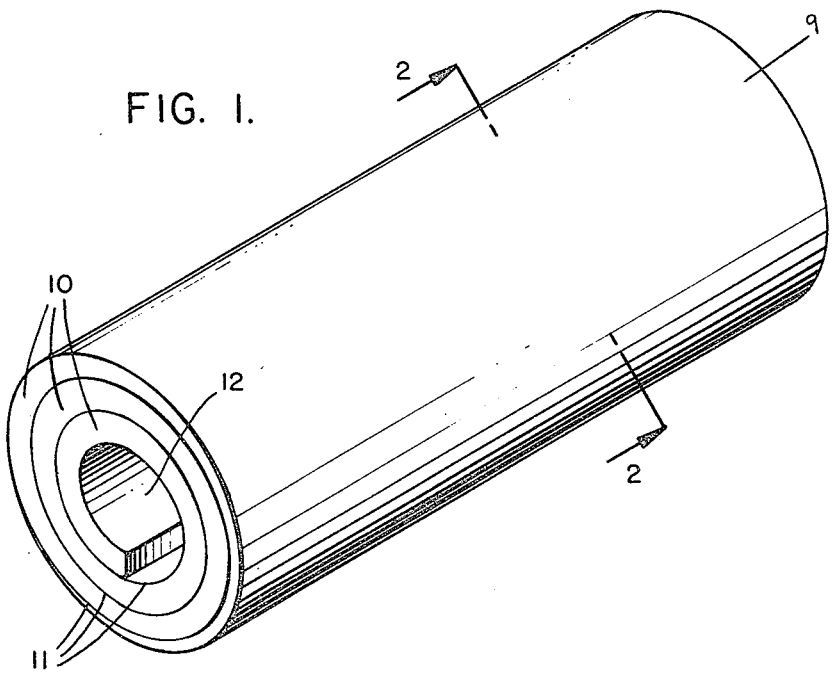
Figure 2:
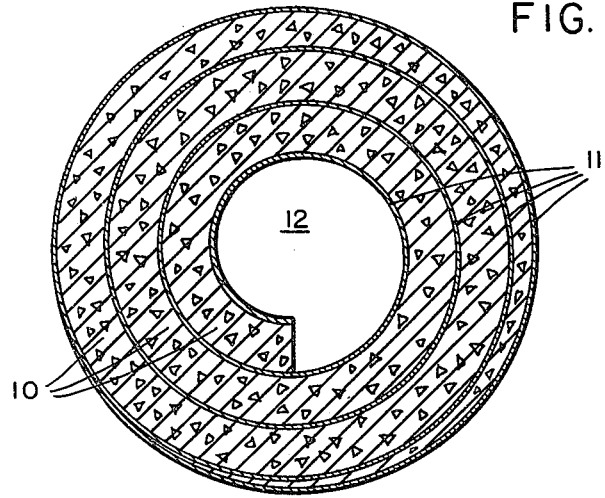

Other objects, features and many of the attendant advantages of this invention will become readily appreciated as the same become better understood by reference to the following detailed description when considered in connection with the accompanying drawing wherein:

FIG. 1 is a perspective view of a spiral-burning propellant grain made in accordance with the present invention showing an alternate arrangement of propellant composition and burn inhibitor; and FIG. 2 is a cross sectional view of the spiral burning grain taken along lines 2—2 in FIG. 1.

Referring now to FIGS. 1 and 2 there is shown a spiral burning propellant grain 9 which is formed by rolling or pressing a solid propellant composition into sheet 10 of predetermined thickness; coating at least one side of sheet 10 with a burn inhibitor 11; rolling or winding sheet 10 with inhibitor 11 thereon into a cylindrically-shaped grain 9. If the grain formed is of the internal-burning type the sheet is rolled so as to leave a central opening or perforation 12 therethrough as shown. If of the end-burning type the grain is wound without a central perforation.

The propellant grain formed by this method has a generally circular cross section as shown in FIG. 2 which comprises a series of concentric circular layer of propellant 10 and inhibitor 11 whereby one of said layers of inhibitor is positioned between two of said propellant layers. The walls forming the internal perforation and exterior walls of said grain are also generally coated with the burn inhibitor as are the ends.

The propellant composition used herein should be of the type which can be processed and rolled or pressed into sheets of appropriate thickness. Both homogeneous (double-base) and heterogeneous (composite) propellant compositions are suitable. The double based propellant is a gelatinized colloidal mixture consisting of nitrocellulose and an explosive plasticizer, often nitroglycerin. The ingredients are mixed into a homogeneous mass and milled into sheets of predetermined thickness. The composite propellants consist of finely divided solid oxidizing agents embedded in plastic, resinous, or elastomeric matrices which provide fuel for the combustion process. The matrices may be of the rubber-like type such as polysulfide, polyurethane, and plastisol, or the type having a polyester base. Several inorganic oxidizers are used. These include potassium perchlorate, ammonium nitrate, and potassium nitrate. Metals such as aluminum, magnesium, beryllium, etc. are frequently added in order to increase performance. The ingredients are mixed and worked until they become plastic or dough-like, then the mixture is formed into sheets by rolling, pressing or other means. The propellant sheets should be relatively free of air bubbles and surface irregularities. The burn inhibitor which prevents burning everywhere except for the propellant layer is applied by spraying, painting, dipping or layering a film or layer of predetermined thickness onto the propellant sheet. The burn inhibitors are different for the homogeneous and heterogeneous types of propellants. The double base or homogeneous systems use cellulosic materials such as cellulosic acetate or ethyl cellulose. A layer of ethyl cellulose was positioned on a sheet of a double base propellant composition and the two wound around each other like a jelly roll builds up a generally circular cross sectional area thereby forming a grain having a relatively thick propellant layer and a relatively thin burn inhibitor layer. With the composite or hetergeneous type propellant compositions the binder without oxidizer could be used as a burn inhibitor. It is sprayed, painted, or rolled onto at least one side of the sheet of propellant and rolled or wound into a cylindrical form, then allowed to cure for several days, the time and temperature being dependent upon the ingredients of the composition. This structural arrangement provides spiral burning which allows long burn times with a maximum of heat transfer to the rocket motor case. Such a propellant grain structure allows for a lighter motor casing for long duration flights since insulation can be decreased.

Obviosuly many modifications and variations of the present invention are possible in the light of the above teachings. It is therefore to be understood that within the scope of the appended claims the invention may be practical otherwise than as specifically described.

What is claimed is:
1. The spiral burning cylindrical propellant grain comprising
   a plurality of concentric layers of double-base propellant composition consisting essentially of nitrocellulose and nitroglycerin; and
   a plurality of concentric relatively thin layers of an inhibitor consisting essentially of ethyl cellulose;
   said inhibitor layer arranged alternately to form the grain whereby one of said layers is positioned between two of said propellant layers so that upon ignition burning occurs along said propellant layer in the form of a spiral.

2. A method for fabricating the grain of claim 1 which comprises
   (a) mixing said double-base composition consisting essentially of nitrocellulose and nitroglycerin into a dough-like, bubble-free mass;
   (b) rolling said mass into a sheet of propellant of predetermined thickness;
   (c) positioning a relatively thin layer of said burn inhibitor consisting of ethyl cellulose directly on said sheet of propellant;
   (d) rolling said sheet of propellant and said layer of inhibitor into a jelly-roll shaped grain having a generally circular cross sectional area thereby forming a grain having a relatively thick propellant layer and a relatively thin inhibitor layer; and
   (e) curing said grain.

References Cited

UNITED STATES PATENTS

| | | | |
|---|---|---|---|
| 1,896,642 | 2/1933 | O'Neil | 264—3 X |
| 2,147,698 | 2/1949 | Goodyear | 149—98 X |
| 3,067,686 | 12/1962 | Coover et al. | 264—3 X |
| 3,159,104 | 12/1964 | Hodgson | 102—101 |
| 3,227,588 | 1/1966 | Jones et al. | 149—2 X |
| 3,250,829 | 5/1966 | Wall | 149—2 X |

LELAND A. SEBASTIAN, Primary Examiner

U.S. Cl. X.R.

149—2, 19, 20, 44, 98; 264—3